US005709124A

United States Patent [19]

Murayama

[11] Patent Number: 5,709,124

[45] Date of Patent: Jan. 20, 1998

[54] HOG RING CLAMPING DEVICE

[75] Inventor: Takashi Murayama, Honjo, Japan

[73] Assignee: Meiho Co., Ltd., Tokyo, Japan

[21] Appl. No.: 786,765

[22] Filed: Jan. 21, 1997

[30] Foreign Application Priority Data

Feb. 2, 1996 [JP] Japan .................................... 8-017632

[51] Int. Cl.[6] ................................ B21D 7/06; B23Q 7/10

[52] U.S. Cl. ..................... 72/409.03; 72/424; 72/453.16; 29/243.56; 29/816; 227/120

[58] Field of Search ................................ 72/409.03, 424, 72/453.16; 29/243.56, 816; 227/135–137, 120, 130

[56] References Cited

U.S. PATENT DOCUMENTS

| | | | |
|---|---|---|---|
| 3,189,220 | 6/1965 | Mullaney | 227/120 |
| 3,628,230 | 12/1971 | Grise | 72/409.02 |
| 4,746,046 | 5/1988 | Frye | 227/120 |
| 5,123,273 | 6/1992 | Kawabata | 72/409.03 |

*Primary Examiner*—Daniel C. Crane

*Attorney, Agent, or Firm*—Birch, Stewart, Kolasch & Birch, LLP

[57] ABSTRACT

The present invention relates to a hog ring clamping device such as a C ring clamping device. In the hog ring clamping device of the invention, a hog ring magazine and jaws are provided to a hog ring clamping device body. A main pneumatic cylinder for moving the jaws pivotally is installed. A feed pneumatic cylinder is attached to the hog ring clamping device body. At least one feed member is mounted to a piston rod of the feed pneumatic cylinder with a unidirectional rotating device therebetween. The feed member is placed in a position for contact with hog rings engaged with the hog ring magazine. A bracket is mounted on the hog ring clamping device body. An arm is mounted pivotally to the bracket and a unidirectional rotating device is mounted to the arm. A presser wheel is mounted on the unidirectional rotating device, and a rod is attached to the arm. A coil spring is used to connect the arm with the bracket resiliently. One end of a flat spring is held between the feed pneumatic cylinder and a bracket for mounting the feed pneumatic cylinder to the hog ring clamping device body. Another end of the flat spring is fixed to the arm, and an extrusion portion extruding toward the neighborhood of the feed member is provided on the flat spring.

11 Claims, 5 Drawing Sheets

HOG RING CLAMPING DEVICE

BACKGROUND OF THE INVENTION

1. Field of the Invention

The present invention relates to a hog ring clamping device such as a C ring clamping device which is used for example, for attaching cover materials to the materials to be attached such as springs of an automobile seat.

2. Description of the Prior Art

In a conventional C ring clamping device, a magazine is mounted on a C ring clamping device body, a feed pneumatic cylinder is installed in the C ring clamping device body, feed members are attached to a piston rod of the feed pneumatic cylinder with one-way bearings between, a bracket is mounted on the C ring clamping device body, and a presser wheel is attached to the bracket with another one-way bearing between.

In such C ring clamping device, a C ring assembly comprising a large number of C rings is loaded into the magazine. Then, the feed members are put into reciprocating motion by the feed pneumatic cylinder to feed the C ring assembly. The presser wheel prevents the C ring assembly from moving backward.

In the conventional C ring clamping device, however, when another fresh C ring assembly is loaded into the magazine after the rear end of the preceding C ring assembly passed through the feed members, the fresh C ring assembly may not be fed forward, since the fresh C ring assembly is also put into reciprocating motion accompanied with the reciprocating motion of the feed members, if the frictional force between the fresh C ring assembly and the magazine is small and the rotational force required to rotate rotationalwise the one-way bearings attached to the piston rod is large.

SUMMARY OF THE INVENTION

It is an object of the present invention to provide a hog ring clamping device which can certainly feed a hog ring assembly forward when a fresh hog ring assembly is loaded into the magazine.

According to the present invention, there is provided a hog ring clamping device comprising a hog ring clamping device body, a hog ring magazine mounted onto the hog ring clamping device body, jaws provided in the hog ring clamping device body, a main pneumatic cylinder installed in the hog ring clamping device body for moving the jaws pivotally, a feed pneumatic cylinder attached to the hog ring clamping device body, at least one feed member mounted to a piston rod of the feed pneumatic cylinder with a unidirectional rotating means between and placed in a position to be in contact with hog rings loaded into the magazine, a flat spring with the both ends fixed to the hog ring clamping device body and provided with an extrusion portion extruding toward the neighborhood of the feed member.

In the hog ring clamping device of the present invention, when another fresh hog ring assembly is loaded into the magazine after the rear end of the preceding hog ring assembly passed the feed member portion, the hog ring assembly can be fed certainly, since the fresh hog ring assembly is prevented from moving backward by the extrusion portion.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE INVENTION

Figure 1:
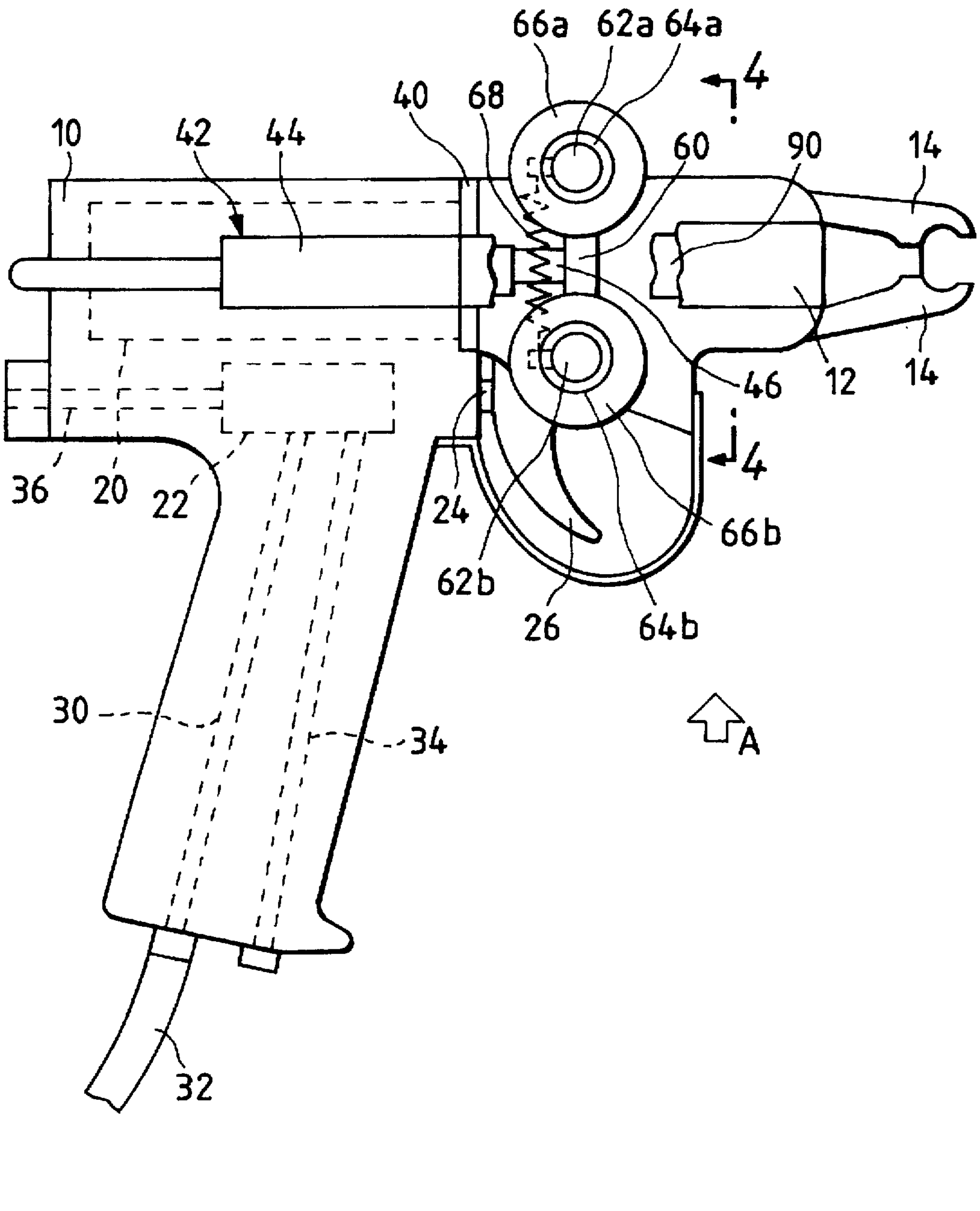
FIG. 1 is a schematic view showing a C ring clamping device according to the present invention.

A C ring clamping device which is a preferred embodiment of the present invention is shown in FIGS. 1 to 5.

As shown, a C ring clamping device body 10 is equipped with a magazine 12, jaws 14, a main pneumatic cylinder 20 for moving the jaws 14 pivotally, and a direction control valve 22 of push button type. A push button 24 of the direction control valve 22 protrudes out of the C ring clamping device body 10, and a trigger 26 for pushing the push button 24 is provided.

The C ring clamping device body 10 is further equipped with an air passage 30 communicating with an pneumatic pressure inlet port of the direction control valve 22. One end of an air hose 32 is connected to the air passage 30, while the other end of the air hose 32 can be connected to a pneumatic pressure supply equipment (not shown). Air passages 34, 36 communicating with respective outlet ports of the direction control valve 22 are provided in the C ring clamping device body 10.

Figure 6:
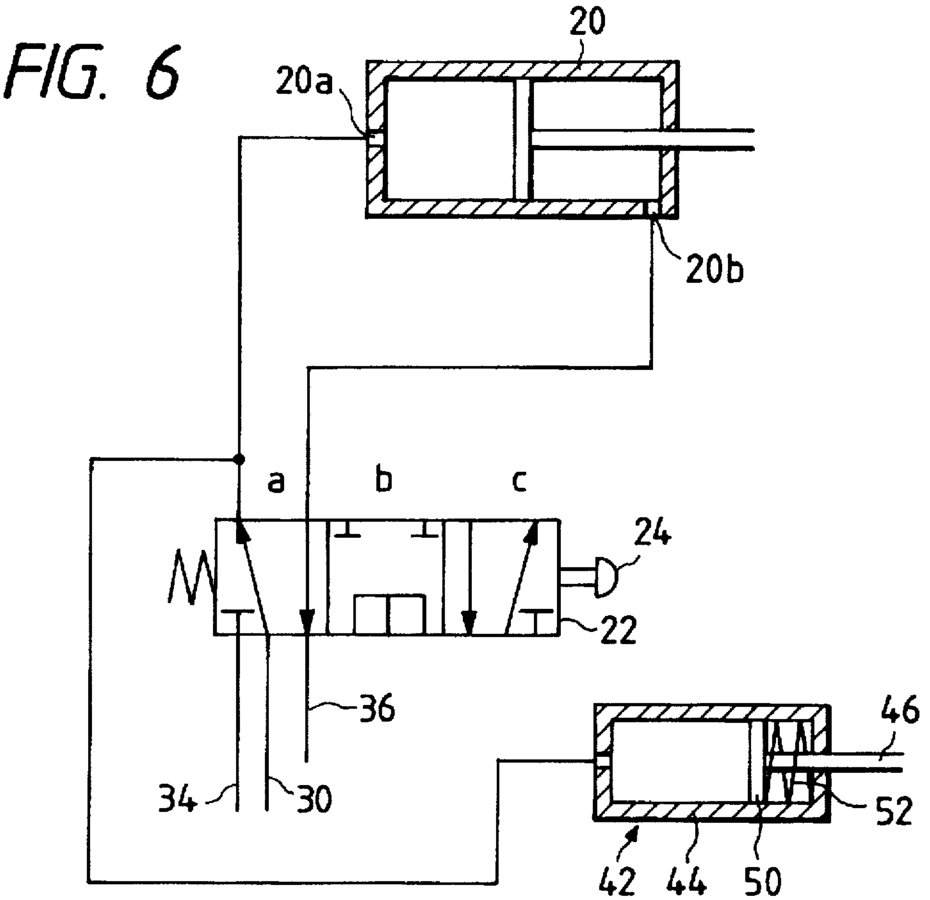
FIG. 6 is a pneumatic circuit diagram of an pneumatic cylinder of the C ring clamping device illustrated in FIGS. 1 to 5.

As shown in FIG. 6, when the direction control valve 22 is in position a, the air passage 30 is connected to a port 20*a* of the main pneumatic cylinder 20. At the same time, a port 20*b* of the main pneumatic cylinder 20 is connected to the air passage 36.

When the direction control valve 22 is in position b, the air passages 30, 34 and 36 are communicated with each other.

When the direction control valve 22 is in position c, the air passage 30 is connected to the port 20*b* of the main pneumatic cylinder 20. At the same time, the port 20*a* of the main pneumatic cylinder 20 is connected to the air passage 34.

Further, a feed pneumatic cylinder 42 is attached to the C ring clamping device body 10 with a bracket 40 between. As shown in FIG. 6, the port 20*a* of the main pneumatic cylinder 20 is connected to the feed pneumatic cylinder 42. A spring 52 is provided between a piston 50 of the feed pneumatic cylinder 42 and an pneumatic cylinder body 44 of the feed pneumatic cylinder 42.

A movable member 60 is attached to a piston rod 46 of the feed pneumatic cylinder 42. A pair of support members 62*a* and 62*b* is attached to the movable member 60 pivotally around a line perpendicular to the plane of FIG. 4. One end of a spring 68 is fixed to the support member 62*a*, while the other end of the spring 68 is fixed to the support member 62*b*. An one-way bearing 64*a* which rotates only counterclockwise in FIG. 1 is attached to the support member 62*a*. Another one-way bearing 64*b* which rotates only clockwise in FIG. 1 is attached to the support member 62*b*. A feed member 66*a* is mounted on the one-way bearing 64*a*, while another feed member 66*b* is mounted on the one-way bearing 64*b*. The feed members 66*a*, 66*b* are placed in the position to be in contact with C rings being engaged with the magazine 12.

Figure 2:
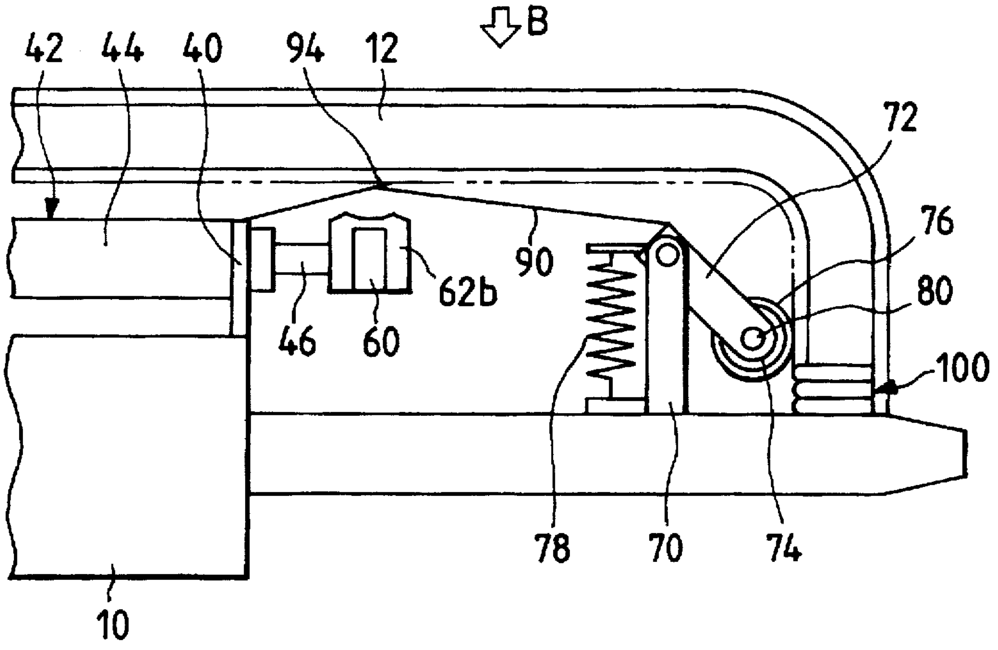
FIG. 2 is an enlarged schematic view as seen in the direction of arrow A in FIG. 1.
Figure 3:
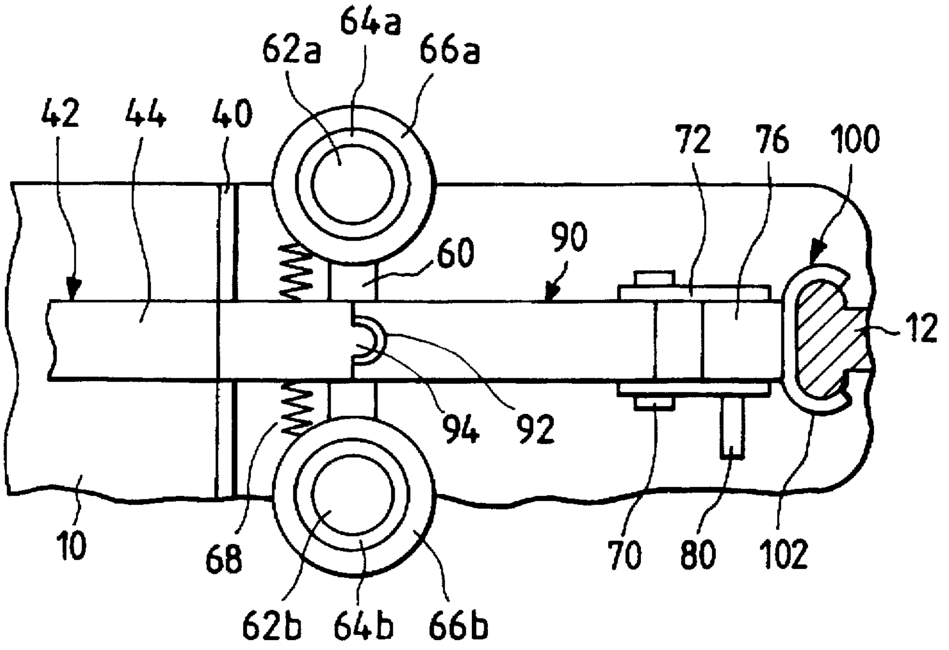
FIG. 3 is a partial broken view as seen in the direction of arrow B in FIG. 2.
Figure 4:
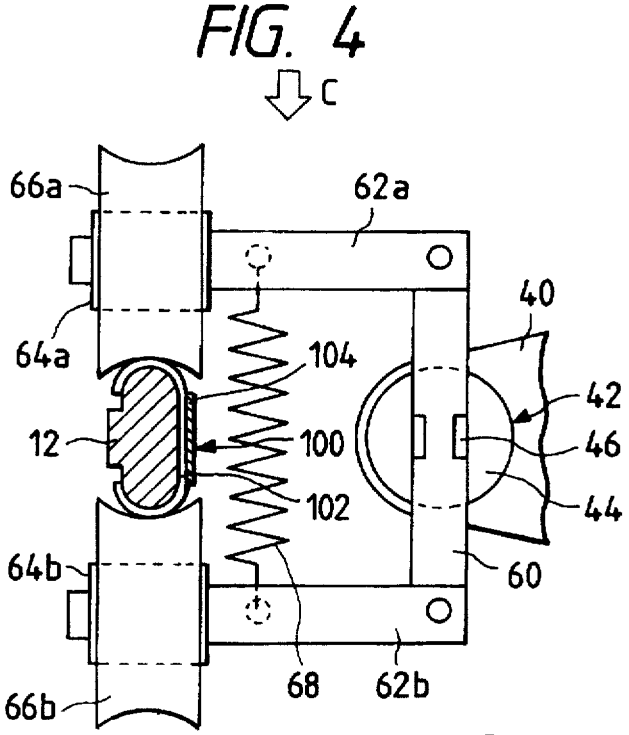
FIG. 4 is an enlarged partial sectional view taken along line 4—4 in FIG. 1.
Figure 5:
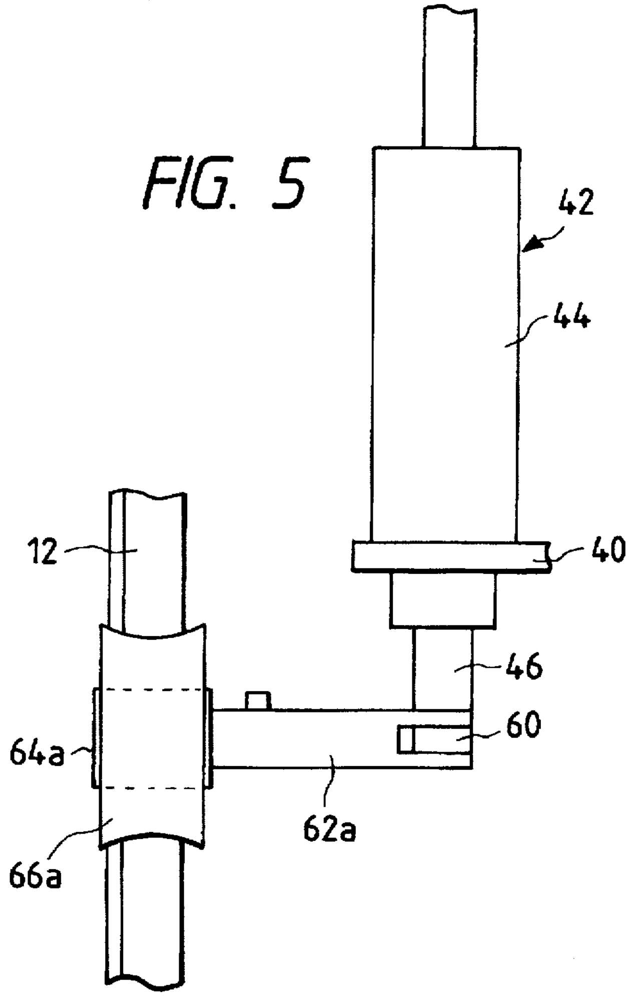
FIG. 5 is a view as seen in the direction of arrow C in FIG. 4.

Further, a bracket 70 is mounted on the C ring clamping device body 10. An arm 72 is attached pivotally to the bracket 70. An one-way bearing 74 which rotates only clockwise in FIG. 2 is attached to the arm 72. A presser wheel 76 is mounted on the one-way bearing 74. A rod 80 is further attached to the arm 72. A coil spring 78 is used to connect the arm 72 with the bracket 70 resiliently.

One end of a flat spring 90 made of spring steel is held between the pneumatic cylinder body 44 of the feed pneumatic cylinder 42 and the bracket 40, while the other end of the flat spring 90 is fixed to the arm 72. The flat spring 90 is bent at end portion of a slit 92 of a semicircular arc shape opened in the flat spring 90. Then, an extrusion portion 94 extruding toward the neighborhood of the feed members 66*a*, 66*b* for the magazine 12 is formed.

Figure 7:
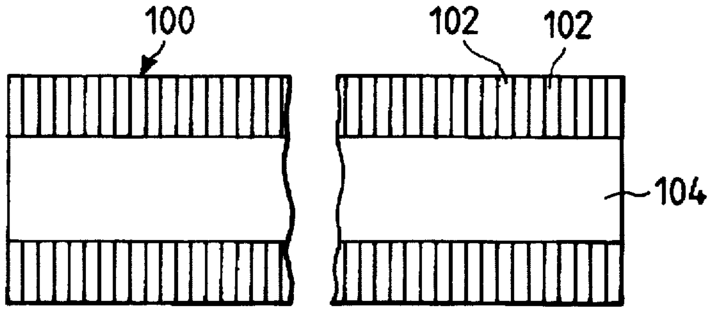
FIG. 7 is a plan view of a C ring assembly.
Figure 8:
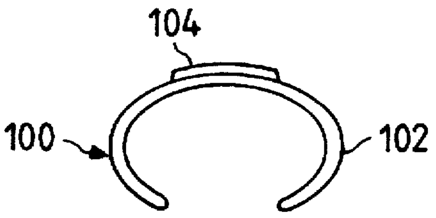
FIG. 8 is a side view of the C ring assembly illustrated in FIG. 7.

In FIGS. 7 and 8, a C ring assembly to be loaded into the magazine 12 of the C ring clamping device illustrated in FIGS. 1 to 5 is shown. As shown, a large number of C rings 102 are arranged in a row, and an adhesive tape 104 is bonded to the backs of the C rings 102 to form a C ring assembly 100 comprising the unified C rings 102.

In the C ring clamping device explained above, when the pneumatic pressure supply equipment is connected to the inlet end of the air hose 32 and the trigger 26 is not pulled, the direction control valve 22 is in position a. Accordingly, compressed air is supplied from the pneumatic pressure supply equipment to the port 20*a* of the main pneumatic cylinder 20, then the main pneumatic cylinder 20 is extended and the jaws 14 are opened.

In this condition, if the trigger 26 is pulled, the direction control valve 22 changes its position into position c via position b. Then, compressed air is supplied from the pneumatic pressure supply equipment to the port 20*b* of the main pneumatic cylinder 20, the main pneumatic cylinder 20 is retracted and the jaws 14 are closed. As the result, the shape of the C ring 102 is changed by the jaws 14 to clamp a material to be clamped (not shown).

After that, if the trigger 26 is released, the direction control valve 22 returns into position a via position b. Then, compressed air is supplied from the pneumatic pressure supply equipment to the port 20*a* of the main pneumatic cylinder 20, the main pneumatic cylinder 20 is extended and the jaws 14 are opened. Thus, clamping is made.

Further, when the position of the direction control valve 22 is changed into position a, compressed air is supplied from the pneumatic pressure supply equipment to the feed pneumatic cylinder 42. Accordingly, the piston 50 is moved to the right in FIG. 6 opposing against the spring force of the spring 52. When the position of the direction control valve 22 is changed into position c, since the feed pneumatic cylinder 42 communicates with the air passage 34 through the direction control valve 22, the piston 50 is moved to the left in FIG. 6 by the spring force of the spring 52. Thus, when the trigger 26 being pulled is released, the movable member 60 is moved to the right in FIG. 1, and after that, the movable member 60 is moved to the left in FIG. 1 when the trigger 26 is pulled again.

When the movable member 60 is moved to the right in FIG. 1, the feed members 66*a*, 66*b* are moved to the right in FIG. 1. Further, the feed members 66*a*, 66*b* are being pressed by the spring 68 to the C ring assembly 100 mounted to the magazine 12. Furthermore, the feed member 66*a* does not rotate clockwise in FIG. 1 due to the one-way bearing 64*a*, and the feed member 66*b* does not rotate counterclockwise in FIG. 1 due to the one-way bearing 64*b*. Therefore, the C ring assembly 100 is fed forward being pushed the forward portion by the feed members 66*a*, 66*b*. Thus, the first C ring 102 of the C ring assembly 100 is fed into the jaws 14 being opened.

Next, when the movable member 60 is moved to the left in FIG. 1, the feed members 66*a*, 66*b* are moved to the left in FIG. 1. However, the presser wheel 76 is pressed to the C ring assembly 100 by the coil spring 78 and the extrusion portion 94 is pressed to the adhesive tape 104 of the C ring assembly 100. Furthermore, the feed member 66*a* rotates counterclockwise in FIG. 1 and the feed member 66*b* rotates clockwise in FIG. 1. Therefore, the C ring assembly 100 mounted on the magazine 12 never moves back.

Accordingly, materials to be clamped are clamped with the C ring 102 by pulling the trigger 26 and the C ring 102 is fed into the jaws 14 portion by releasing the trigger 26.

Figure 9:
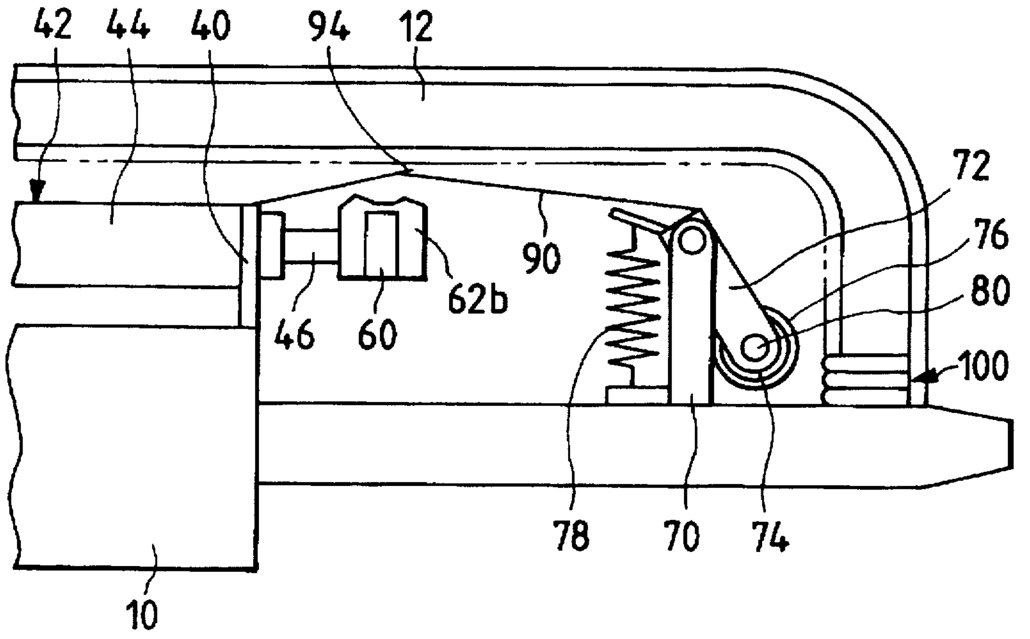
FIG. 9 is a view explanatory of the operation of the C ring clamping device illustrated in FIGS. 1 to 5.

Further, as shown in FIG. 9, when the rod 80 is pushed downward in FIG. 9 and the arm 72 is rotated clockwise in FIG. 9 opposing against the spring force of the coil spring 78, the presser wheel 76 is detached from the C ring assembly 100 and the flat spring 90 is deformed to detach the extrusion portion 94 from the adhesive tape 104 of the C ring assembly 100. Therefore, the C ring assembly 100 can be removed from the magazine 12.

Figure 10:
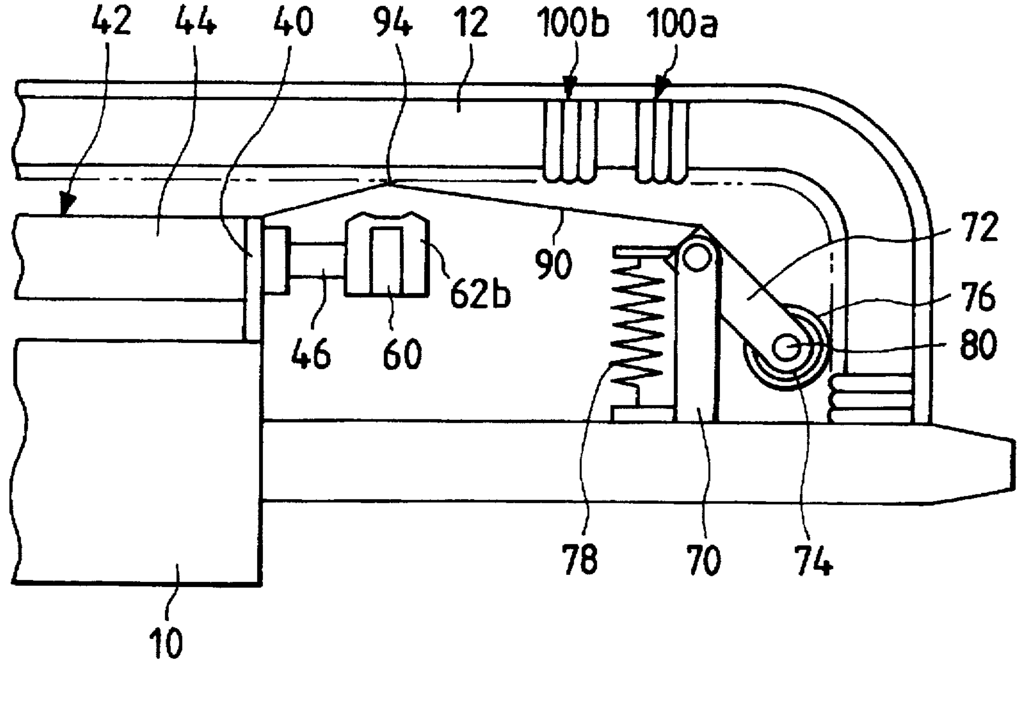
FIG. 10 is another view explanatory of the operation of the C ring clamping device illustrated in FIGS. 1 to 5.

In the C ring clamping device as explained above, as shown in FIG. 10, in case that another fresh C ring assembly 100*b* is mounted into the magazine 12 after the rear end of the preceding C ring assembly 100*a* passed the feed members 66*a*, 66*b* portion, the C ring assembly 100*b* is prevented from moving backward by the extrusion portion 94 when the feed members 66*a*, 66*b* move to the left in FIG. 10, even though the frictional force between the fresh C ring assembly 100*b* and the magazine 12 is small and the rotational force required to rotate rotationalwise the one-way bearing 64*a*, 64*b* is large. Therefore, the C ring assembly 100*b* is also prevented from reciprocating motion in the left and right directions in FIG. 100 accompanied with the reciprocating motion of the feed members 66*a*, 66*b* in the left and right directions in FIG. 100. Since the C ring assemblies 100*a*, 100*b* can be fed certainly, the efficiency of clamping works with the C ring 102 can be improved remarkably.

In the preferred embodiment explained above, only the C ring clamping device is mentioned, however, it is apparent that the present invention is also applicable to other hog ring clamping devices. Further, in the above embodiment although two feed members 66a, 66b are used, only one feed member will suffice.

The invention being thus described, it will be obvious that the same may be varied in many ways. Such variations are not to be regarded as a departure from the spirit and scope of the invention, and all such modifications as would be obvious to one skilled in the art were intended to be included within the scope of the following claims.

What is claimed is:

1. A hog ring clamping device comprising:

a) a hog ring clamping device body;

b) a hog ring magazine mounted onto said hog ring clamping device body for loading a plurality of hog rings;

c) jaws provided in said hog ring clamping device body for clamping a hog ring;

d) a main pneumatic cylinder for moving said jaws pivotally;

e) a feed pneumatic cylinder attached to said hog ring clamping device body;

f) at least one feed member mounted to a piston rod of said feed pneumatic cylinder with a unidirectional rotating means between and placed in a position to be in contact with hog rings loaded into said hog ring magazine so as to feed hog rings to said jaws;

g) a flat spring with both ends fixed to said hog ring clamping device body; and h) an extrusion portion provided in said flat spring and extruding toward the neighborhood of said feed member so that the extrusion portion can press against said hog rings.

2. The hog ring clamping device according to claim 1, wherein said flat spring is made of spring steel.

3. The hog ring clamping device according to claim 1, wherein said extrusion portion is formed in said flat spring by opening a slit of a semicircular arc shape in said flat spring and bending said flat spring at an end portion of said slit.

4. The hog ring clamping device according to claim 1, wherein a bracket is mounted on said hog ring clamping device body, an arm is attached pivotally to said bracket, an one-way bearing is attached to said arm, a presser wheel is mounted on said one- way bearing, and a coil spring is used to connect said arm with said bracket resiliently.

5. The hog ring clamping device according to claim 4, wherein a rod is attached to said arm.

6. The hog ring clamping device according to claim 4, wherein one end of said flat spring is held between said feed pneumatic cylinder and a bracket for mounting said feed pneumatic cylinder to said hog ring clamping device body.

7. The hog ring clamping device according to claim 6, wherein another end of said flat spring is fixed to said arm.

8. The hog ring clamping device according to claim 1, wherein said hog ring is a C ring.

9. The hog ring clamping device according to claim 1, wherein two feed members are provided on both sides of said magazine.

10. The hog ring clamping device according to claim 5, wherein one end of said flat spring is held between said feed pneumatic cylinder and a bracket for mounting said feed pneumatic cylinder to said hog ring clamping device body.

11. The hog ring clamping device according to claim 10, wherein another end of said flat spring is fixed to said arm.

* * * * *